US008453581B2

(12) United States Patent
Wickman et al.

(10) Patent No.: US 8,453,581 B2
(45) Date of Patent: Jun. 4, 2013

(54) HIGH RAIL EXCAVATOR

(75) Inventors: Dean T. Wickman, Quinnesec, MI (US);
Steven L. Benck, North Barrington, IL
(US); Dennis Hanke, Algonquin, IL
(US); Andrew C. Wickman, Quinnesec,
MI (US); Thomas J. Wickman, Iron
Mountain, MI (US)

(73) Assignee: Rail Construction Equipment Company, Rockford, IL (US)

( * ) Notice: Subject to any disclaimer, the term of this patent is extended or adjusted under 35 U.S.C. 154(b) by 191 days.

(21) Appl. No.: 12/844,610

(22) Filed: Jul. 27, 2010

(65) Prior Publication Data
US 2012/0024189 A1    Feb. 2, 2012

(51) Int. Cl.
*B61F 1/00*    (2006.01)
(52) U.S. Cl.
USPC ...................................... 105/215.1

(58) Field of Classification Search
USPC .................. 105/215.1, 215.2; 37/104–107
See application file for complete search history.

(56) References Cited

U.S. PATENT DOCUMENTS

| 4,534,297 A * | 8/1985 | Johnson, Sr. .................. 105/90.2 |
| 2005/0155257 A1 * | 7/2005 | Pike et al. ........................ 37/104 |
| 2009/0101042 A1 * | 4/2009 | Foote et al. ................. 105/215.1 |

* cited by examiner

*Primary Examiner* — R. J. McCarry, Jr.
(74) *Attorney, Agent, or Firm* — Reinhart Boerner Van Deuren P.C.

(57) ABSTRACT

A high rail excavator is provided. The high rail excavator includes at least one high rail mechanism to elevate the high rail excavator relative to the rails of a railroad track. The high rail mechanism is disposed within an envelope of the tracks, thereby increasing the maneuverability and safety of the high rail excavator. The high rail mechanism includes a power control arrangement that integrates with a power supply of the excavator so that an additional power supply dedicated to the high rail mechanism is not required.

15 Claims, 8 Drawing Sheets

HIGH RAIL EXCAVATOR

FIELD OF THE INVENTION

This invention generally relates to railroad construction equipment and specifically to railroad construction equipment configured to travel on and off railroad tracks.

BACKGROUND OF THE INVENTION

Various types of heavy and light construction equipment are employed to construct and maintain railroad systems. For example, an excavator is one type of heavy equipment commonly used to dig the trenching for new railroad tracks or perform other construction and maintenance functions in proximity to the railroad tracks.

Many railroad systems have track networks that extend into remote locations far away from other roads or access points. As a result, getting equipment such as an excavator out to these remote locations can be a difficult task. One solution in the past has been to load the desired equipment, e.g. the excavator, onto a rail car and drive the rail car and equipment out to the desired location using a train engine. As can be readily appreciated, the above solution can be a costly, time consuming, and labor intensive way of getting equipment out to a job site.

To avoid the above cost associated with transporting equipment using a rail car and train engine, a more modern solution has emerged wherein the construction equipment itself incorporates a system that allows the vehicle to travel directly on the tracks of the railroad. One such system is commonly referred to as a "high-rail" system. In a typical high-rail system, a pair of steel rail wheels similar to that found on a traditional rail car are attached to a frame of the equipment and can engage the railroad tracks to utilize them as a means of travel.

A typical excavator can include a pair of tracks used to propel the excavator. A high rail system incorporated with the excavator includes two sets of rail wheels with each set having a mechanism to raise and lower the rail wheels relative to the railroad tracks. One set of rail wheels is interposed between the tracks of the excavator proximate to a leading edge of the tracks. The other set of rail wheels is interposed between the tracks of the excavator proximate to a trailing edge of the tracks.

The distance between the inner edges of each of the pair of tracks of the excavator is such that there is not enough room between them to entirely fit the rail wheels and the mechanism associated therewith. As such, at least a portion of the rail wheels and/or the mechanism extends beyond the leading edge or the trailing edge of the tracks of the excavator. When both sets of rail wheels engage the railroad tracks, the excavator's tracks are elevated from the ground so that the excavator can ride upon the railroad tracks using the rail wheels. When both sets of rail wheels are out of engagement with the railroad tracks, the excavator's tracks are in contact with the ground so that the excavator can move thereabout.

Unfortunately, several problems have emerged when using the above high rail systems. With reference to FIG. 14, a typical high rail mechanism 306 extends in front of either end of the tracks of the excavator 302, thereby extending the excavator's 302 overall length. As a consequence, the angle of approach 308 that the excavator can normally overcome is reduced due to the extended overall length of the excavator 302. For example, when the excavator encounters a relatively steep angle of approach 308, the leading set of rail wheels 304, or other portions of the high rail mechanism 306, will hit the angle of approach 308 before the tracks do, and thereby prevent or substantially inhibit further forward motion of the excavator 302.

Second, the excavator's overall length is increased such that the excavator has a larger footprint than an excavator not incorporating a high rail system. As a result, there is an inherent safety risk that an operator not familiar with the larger dimensions of an excavator incorporating a high rail system might strike personnel or other equipment on the ground with rail wheels extending outside and in front of either end of the tracks.

In view of the above, it is desirable to have a high rail excavator that overcomes the mobility and safety issues of current systems.

Embodiments of the invention provide such a high rail excavator. These and other advantages of the invention, as well as additional inventive features, will be apparent from the description of the invention provided herein.

BRIEF SUMMARY OF THE INVENTION

In view of the above, embodiments of the invention provide a high rail excavator having at least one high rail mechanism that overcomes existing problems in the art. More particularly, embodiments of the invention provide a new and improved high rail excavator that incorporates at least one high rail mechanism that increases the maneuverability and safety of the high rail mechanism. Still more particularly, embodiments of the invention provide a compact high rail mechanism that can raise and lower a pair of wheels into and out of engagement with the rails of a railroad track while staying generally within an existing footprint of the excavator.

In another embodiment, an excavator that allows for the containment of a high rail mechanism within an existing foot print of the excavator is provided. The excavator according to this embodiment includes a pair of tracks in opposed space relation. Each one of the pair of tracks has an inner peripheral edge that are spaced apart by a first distance. A high rail mechanism is interposed between the inner peripheral edges. The high rail mechanism has a pair of wheels spaced apart by a second distance. The first distance is greater than the second distance such that the high rail mechanism is interposed between the tracks.

In another embodiment, the pair of wheels are behind a leading edge of the tracks. In yet another embodiment, the pair of wheels have a raised position and a lowered position. The pair of wheels are behind the leading edge of the tracks in the raised position. The pair of wheels are behind the leading edge of the tracks and below a bottom surface of the tracks in the lowered position. In yet another embodiment, the pair of wheels are behind the leading edge and above a transition portion of the pair of tracks.

In another embodiment, the first distance between the inner peripheral edges of the pair of tracks is at least about 4 feet, 8½ inches.

In another embodiment, each one of the pair of tracks has an outer peripheral edge. Each one of the pair of tracks is also supported by a track support structure. Each track support structure has an inner peripheral and an outer peripheral edge. The inner peripheral edge of each one of the pair of tracks extends beyond the inner peripheral edge of the track support structure supporting the track by a first overhang distance. The outer peripheral edge of each one of the pair of tracks extends beyond the outer peripheral edge of the track support structure supporting the track by a second overhang distance. The first overhang distance is less than the second overhang distance.

In another embodiment, a high rail mechanism that can raise and lower a pair of wheels within an envelope of space between the tracks of an excavator is provided. The high rail mechanism according to this embodiment includes an upper mount and a lower mount. A pair of wheels are carried by the lower mount. A linkage is connected between the upper and lower mounts. An actuator is operably connected to the linkage and operable to move the lower mount and the wheels relative to the upper mount in a first direction away from the upper mount. The actuator is also operable to move the lower mount and the wheels relative to the upper mount in a second direction toward the upper mount.

In another embodiment, the linkage includes a first scissor linkage. The first scissor linkage has a first link and a second link. The first link is connected between the upper mount and the second link. The second link is connected between the first link and the lower mount. The first and second links have a first common connection point.

In another embodiment, the linkage includes a second scissor linkage. The second scissor linkage has a first link and a second link. The first link of the second scissor linkage is connected between the upper mount and the second link of the second scissor linkage. The second link of the second scissor linkage is connected between the first link of the second scissor linkage and the lower mount. The first and second links of the second scissor linkage have a second common connection point.

In another embodiment, the high rail mechanism further includes a coupling shaft. The coupling shaft extends between the first and second common connection points. The coupling shaft is connected with the first and second links of the first scissor linkage at the first common connection point. The coupling shaft is connected with the first and second links of the second scissor linkage at the second common connection point.

In another embodiment, the actuator is a linear actuator connected to the coupling shaft. An actuation of the actuator in a first direction simultaneously increases an angle between the first and second links of the first scissor linkage, and increases an angle between the first and second links of the second scissor linkage. An actuation of the actuator in a second direction simultaneously decreases an angle between the first and second links of the first scissor linkage, and decreases an angle between the first and second links of the second scissor linkage.

In another embodiment, the linear actuator is connected to the coupling shaft via a collar. The collar is rotatable about the coupling shaft.

In another embodiment, the high rail mechanism includes a power control arrangement. The actuator is coupled to the power control arrangement. The power control arrangement is operable to divert power supplied from a power source and to a drive system to the actuator to move the actuator in at least one of the first and second directions.

In another embodiment, a method of fixing a high rail mechanism to an excavator is provided. A method according to this embodiment includes adjusting a first distance between the inner peripheral edges of a pair of tracks in opposed space relation to a second distance greater than the first distance. The method further includes step of mounting the high rail mechanism having an overall width less than the second distance to the excavator between the inner peripheral edges. In another embodiment, the step of adjusting includes removing material from each one of the pair of tracks. In another embodiment, the step of adjusting includes removing material from the inner peripheral edges of each one of the pair of tracks.

In another embodiment, the method further includes remounting the pair of tracks to the high rail excavator after removing material such that the inner peripheral edges of the pair of tracks are spaced apart by the second distance. In another embodiment, the step of adjusting includes removing the pair of tracks from the excavator and remounting the tracks such that the inner peripheral edges are at the second distance.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
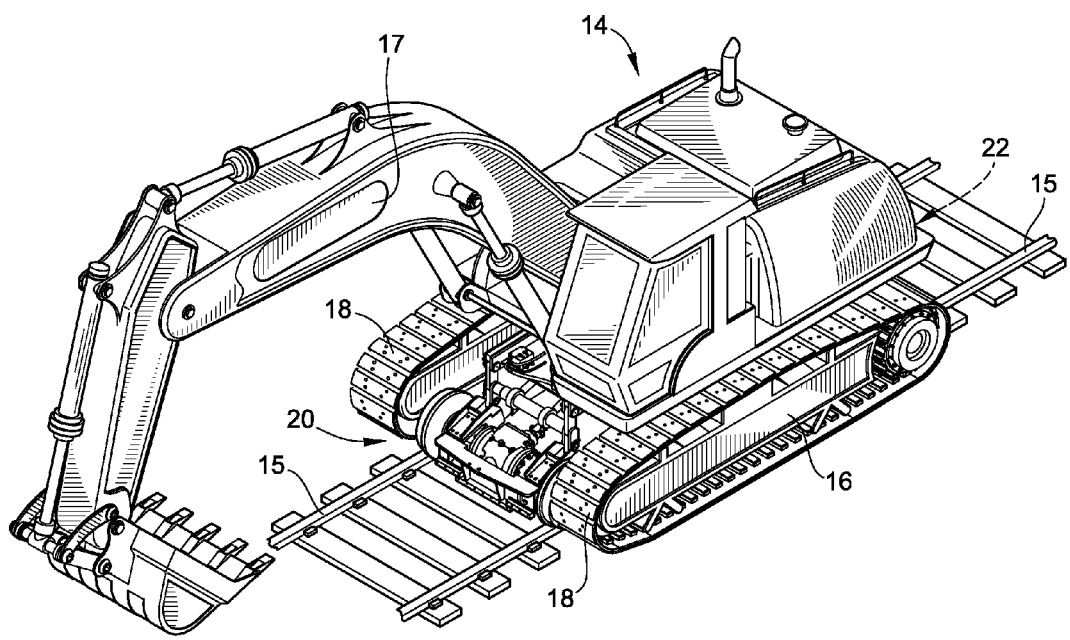
FIG. 1 is an exemplary embodiment of a high rail excavator according to the teachings of the present invention.
Figure 2:
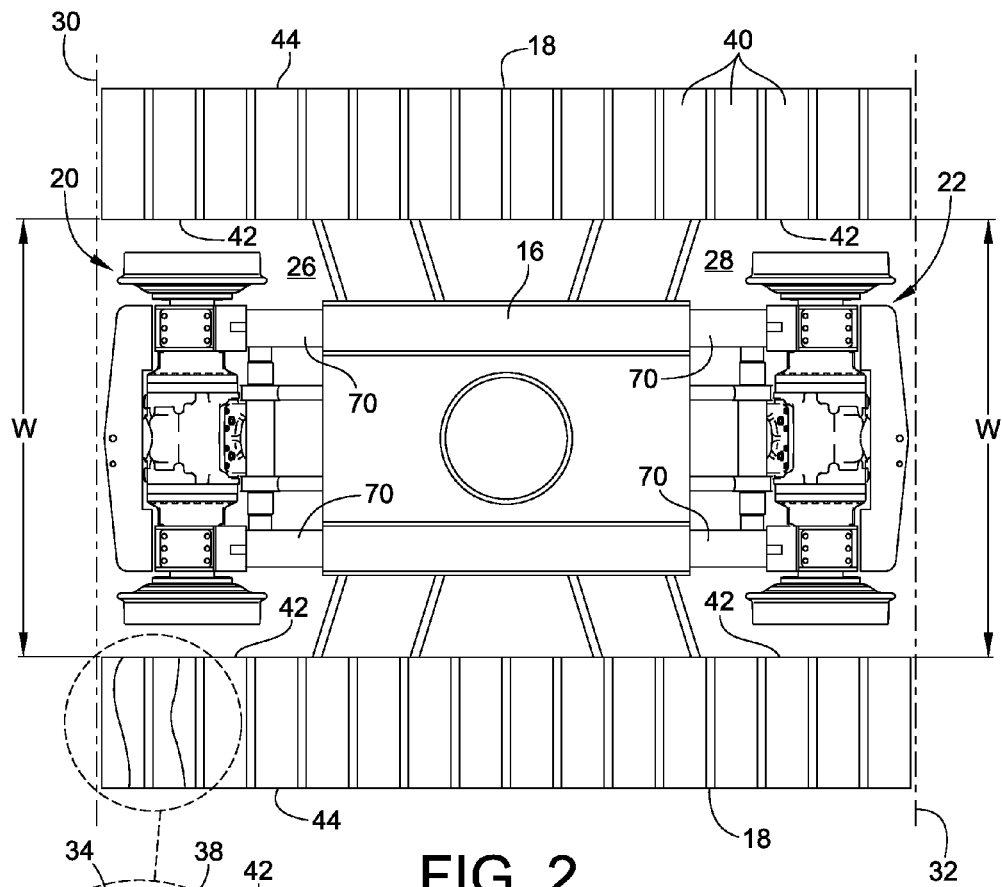
FIG. 2 is a top view of a track bed, tracks, and first and second high rail mechanisms of the high rail excavator of FIG. 1.

Turning now to the drawings, there is illustrated in FIG. 1 an exemplary embodiment of a high rail excavator 14 situated on a pair of conventional railroad tracks having rails 15 and incorporating first and second high rail mechanisms 20, 22 (see also FIG. 2). The high rail mechanisms 20, 22 allow the excavator 14 to travel along the rails 15. While such an exemplary environment will be utilized in describing various features and advantages of embodiments of the invention, such a description should be taken by way of example and not by limitation. Indeed, advantages of embodiments of the invention can be used to improve a variety of heavy equipment where it is desirable for the heavy equipment to travel along the rails 15 of a railroad track.

With reference to FIG. 1, the excavator 14 has a track bed 16. A pair of tracks 18 are also mounted to the track bed 16. The tracks 18 are used to propel the excavator 14 on improved and unimproved surfaces.

A first high rail mechanism 20 is mounted to the track bed 16 and interposed between the tracks 18. Similarly, a second high rail mechanism 22 (see also FIG. 2) is also mounted to the track bed 16 and interposed between the tracks 18 opposite the first high rail mechanism 20. Each of the first and second high rail mechanisms 20, 22 is transitionable between a raised and a lowered position. In the raised position, the first and second high rail mechanisms 20, 22 remain out of contact with the rails 15. In the lowered position, the first and second high rail mechanisms 20, 22 are aligned and in contact with the rails 15 and thereafter used to propel the excavator 14 along the rails 15. As will be discussed in greater detail in the following, the first and second high rail mechanisms 20, 22 have a compact design that in combination with various other aspects of embodiments of the invention overcome the problems of maneuverability and safety of prior equipment as described above.

Turning now to FIG. 2, the excavator 14 of FIG. 1 incorporating the first and second high rail mechanisms 20, 22 overcomes the above noted problems of prior designs in part because the first high rail mechanism 20 does not extend beyond a leading edge 30 of the tracks 18 and the second high rail mechanism 22 does not extend beyond a trailing edge 32 of an opposite end of the tracks 18 in one embodiment. In other embodiments, the first and second high rail mechanisms 20, 22 may incorporate additional components, e.g. tow hooks, that minimally extend beyond the leading and trailing edges 30, 32 respectively, but not to such a degree that the angle of approach or angle of decline of the excavator 14 are affected, and not to such a degree that there is an additional safety risk of striking other personnel or equipment.

The first high rail mechanism 20 is disposed within a first envelope of space 26 bounded by the leading edge 30 of the tracks 18 the inner periphery 42 of the tracks 18, and the track bed 16. Likewise, the second high rail mechanism 22 is contained within second envelope of space 28 bounded by the trailing edge 32 of the tracks 18, the inner periphery 42 of the tracks 18, and the track bed 16.

Each of the tracks 18 is offset relative to a track support structure 38 of the track bed 16 to allow each of the first and second envelopes of space 26, 28 a greater width W in order to contain the first and second high rail mechanisms 20, 22 respectively. The tracks 18 are offset such that an inner peripheral edge 34 of the track support structure (illustrated generally as a road wheel) supporting the tracks generally coincides with an inner peripheral edge 42 of the tracks 18. However, in other embodiments, the inner peripheral edge 42 of the track can extend beyond the inner peripheral edge 34 of the track support structure 38, but not to a length that will interfere with the first or second high rail mechanisms 20, 22.

An outer peripheral edge 44 of the tracks 18 extends beyond an outer peripheral edge 35 of the track support structure 38, making the tracks 18 generally offset relative thereto. It will be recognized that the illustrated track support structure 38 schematically represents the outer limits of a typical track support structure 38 used to support the pair of tracks 18.

The track support structure 38 can include road wheels, sprocket drives, tensioning assemblies, etc (not shown).

A primary benefit of the increased width W of the first and second envelopes of space 26, 28 illustrated in FIG. 2 is the ability to contain the first and second high rail mechanisms 20, 22 within the envelopes of space 26, 28 of the excavator 14. As a result, the overall length of the excavator 14 is generally unchanged despite the presence of the first and second high rail mechanisms 20, 22. Such a configuration facilitates an enhanced climbing ability of the excavator 14.

Additionally, the tracks 18 incorporate track pads 40. The track pads 40 are formed entirely from or at least coated with polyurethane or a similar material so as to not damage the rails 15 as the high rail excavator 14 mounts and dismounts the same.

Figure 3:
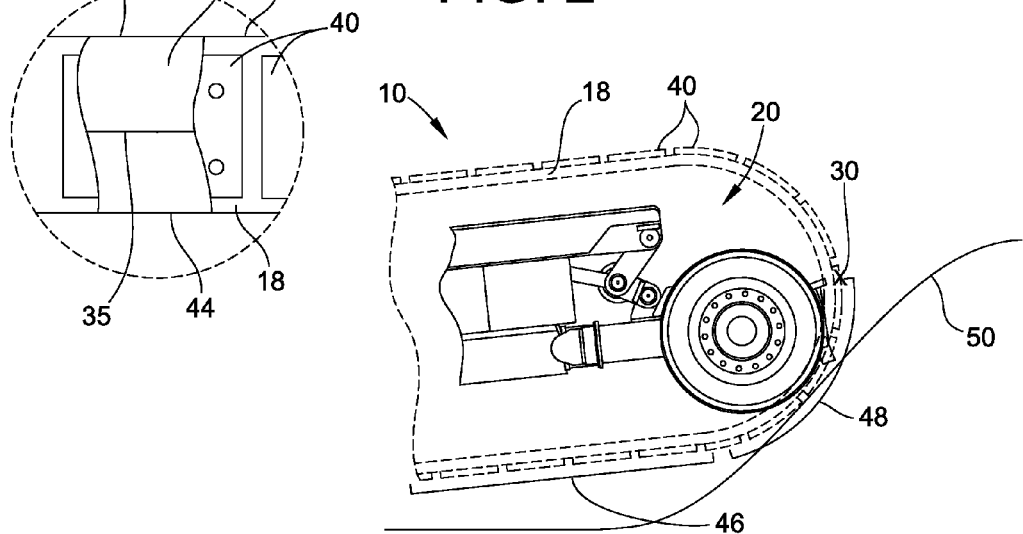
FIG. 3 is a partial side exposed view of the tracks and one of the first and second high rail mechanisms of FIG. 2 encountering an incline.
Figure 11:
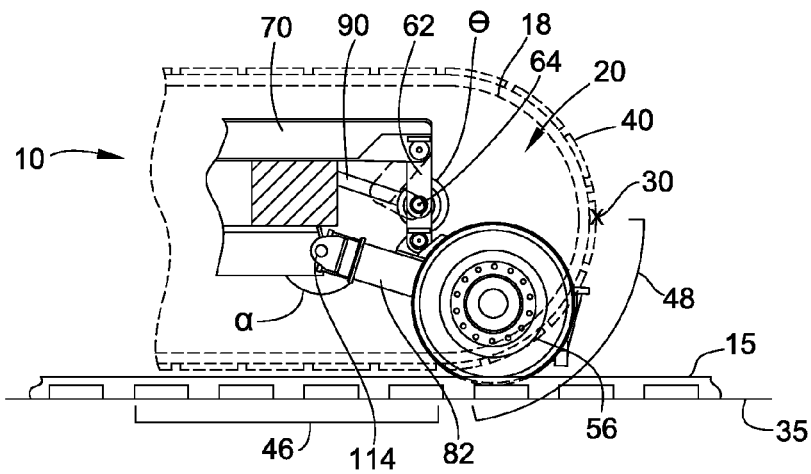
Figure 12:
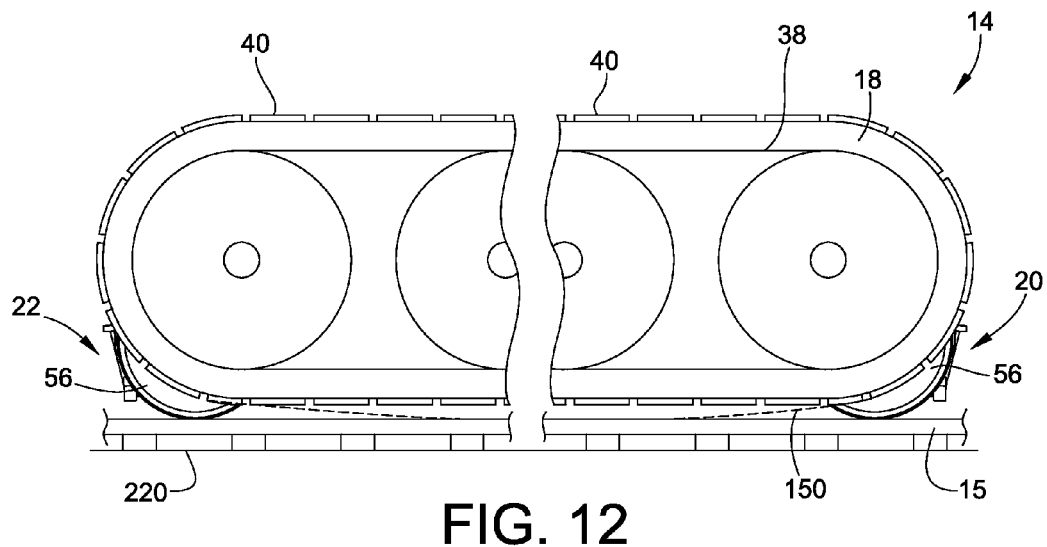
FIG. 12 is a broken partial side view of the excavator of FIG. 1 in an elevated position.
Figure 13:
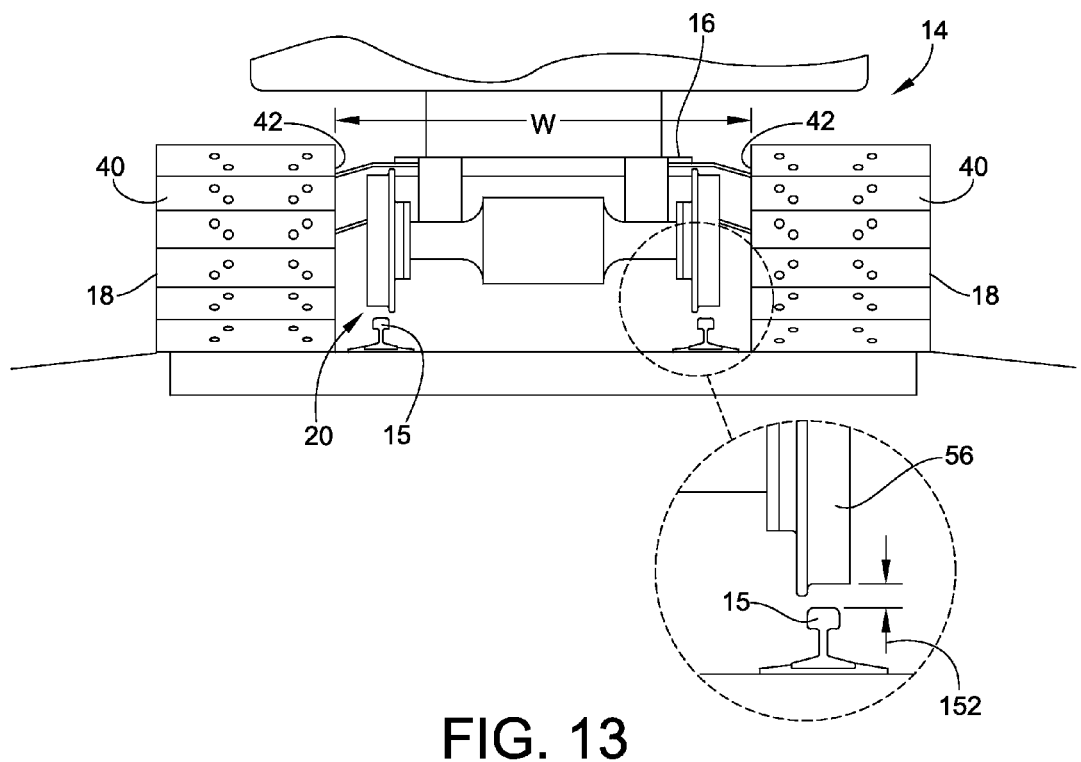
FIG. 13 is a partial front view of the excavator of FIG. 1.
Figure 14:
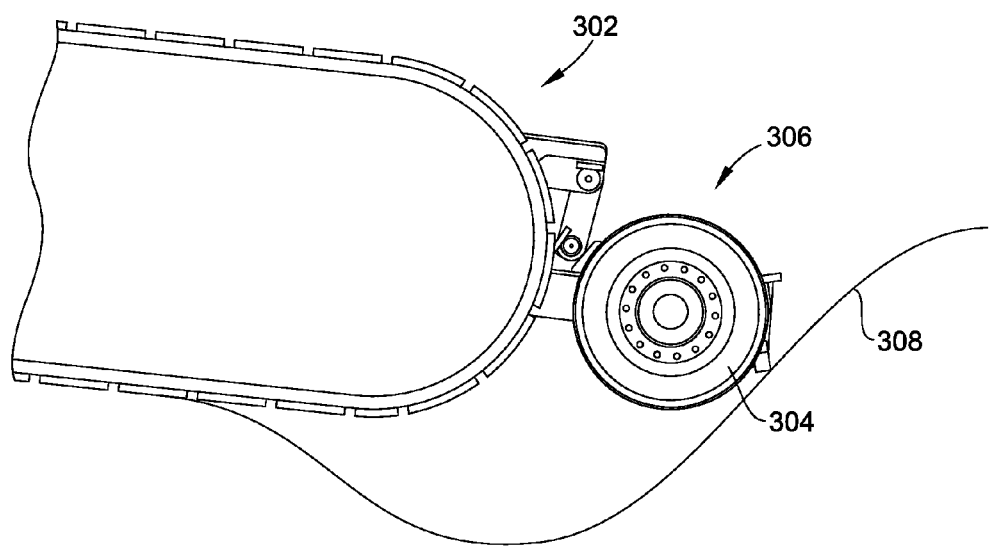
FIG. 14 is a partial side view of a prior art piece of heavy equipment incorporating a prior art high rail mechanism encountering an incline.

Comparing FIG. 3 to FIG. 13, first high rail mechanism 20 of FIG. 3 does not extend beyond the leading edge 30 of the tracks 18, unlike the high rail mechanism 306 of FIG. 13. As a result, when the excavator 14 of FIG. 3 encounters an incline 50, the tracks 18 can make contact with the incline 50 and the excavator can thereafter climb the incline 50. Upon comparison to FIG. 13, it will be appreciated that the above advantage is not the case when the excavator 302 encounters the illustrated incline 308. Instead, the high rail mechanism 306 will engage the incline 308 and prevent further forward movement of the excavator 302.

It is recognized that the same advantage exists for the second high rail mechanism 22 although not illustrated in FIG. 3. Additionally, because the high rail mechanism 20 does not extend beyond the leading edge 30 of the tracks 18, there is a reduced risk that an operator will strike personnel or other equipment situated near the excavator 14 as the excavator 14 does not have an increased footprint or length beyond that of a contemporary excavator.

Each track 18 has a bottom surface 46 and a transition portion 48 that transitions from the bottom surface 46 to the first or second leading edge 30, 32. For simplicity, only the first leading edge is shown in FIG. 3. As illustrated, the first high rail mechanism 20, when in the raised position, is generally above the bottom surface 46, the transition portion 48, and behind the first leading edge 30. As can be appreciated from examination of FIG. 3, the above configuration allows the excavator to more easily encounter and climb the incline 50.

Figure 4:
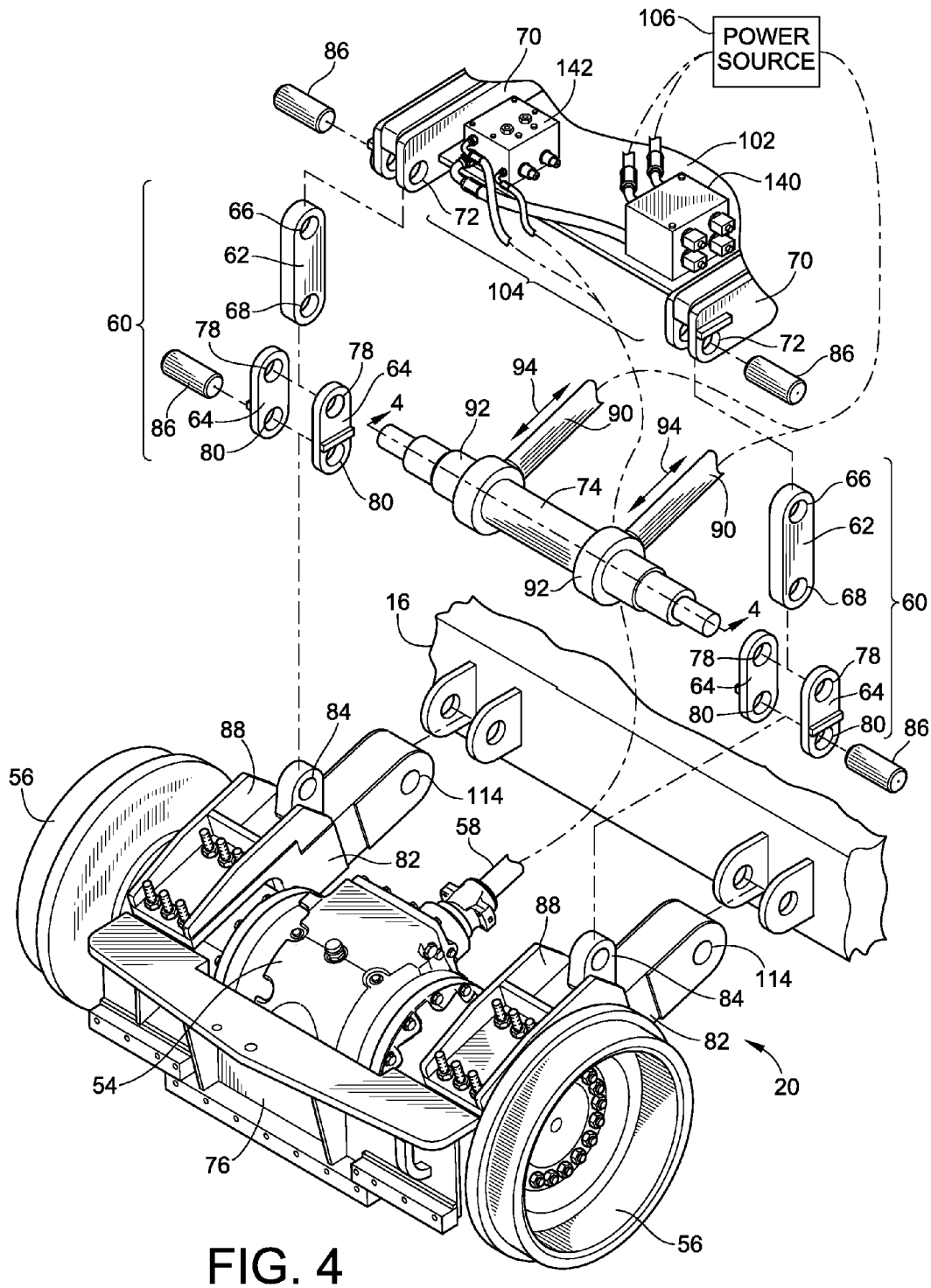
FIG. 4 is an exploded perspective view of one of the first and second high rail mechanisms of FIG. 2.

Turning now to FIG. 4, an exploded view of the first high rail mechanism 20 is illustrated. While the following detailed description will discuss the structural attributes of the first high rail mechanism 20, it is recognized that the same description applies to the second high rail mechanism 22 illustrated in FIG. 2.

The first high rail mechanism 20 has a drive train including a differential 54 that transmits power from a drive shaft 58 to a pair of wheels 56. The drive shaft 58 and differential 54 are a hydraulic drive train in the illustrated embodiment. However, it is recognized that the drive shaft 58 and differential 54 can be embodied as other contemporary mechanical drive trains, e.g. fossil fuel powered, electric, etc. The wheels 56 are selectively engageable and disengageable with the rails 15 (see FIG. 1). As introduced above, the first high rail mechanism 20 has a raised position and a lowered position. The raising and lowering of the first high rail mechanism 20 is made possible in part by a pair of scissor linkages 60. However, it is recognized that fewer or a greater number of scissor linkages 60 may be employed.

Each scissor linkage 60 includes an upper link 62 and a pair of lower links 64. The upper link 62 has a first end 66 and a second end 68. The first end 66 mounts to an upper arm 70 at an upper mounting point 72. The second end 68 mounts to a coupling shaft 74. Similarly, each lower link 64 has a first end 78 and a second end 80. The first end 78 mounts to the coupling shaft 74 such that the first end 78 of the lower link 64 is concentric with the second end 68 of the upper link 62 about the coupling shaft 74 and thereby have a common mounting point. The second end 80 of the lower link 64 mounts to a lower arm 82 at a lower mounting point 84. Although illustrated as using a single upper link 62 and a pair of lower links 64, it is recognized that the scissor linkages 60 could be designed in reverse such that there are two upper links 62 and a single lower link 64 in other embodiments. It is also recognized that a single first link 62 and a single second link 64 can also be employed.

A pair of actuators 90 are also mounted between the coupling shaft 74 and the track bed 16 (not shown). The actuators 90 connect to the coupling shaft 74 via a pair of collars 92. The actuators 90 can increase and decrease their overall length generally along axis 94 to move the coupling shaft 74 relative to the remainder of the first high rail mechanism 20. The actuators are operably connected to a power source 106 of the excavator 14. Although illustrated as a typical hydraulic actuator, the actuators 90 can be electric actuators or other linear actuators using electric or mechanical power sources.

Additionally, the actuators 90 can be omitted entirely, and an arm 17 (see FIG. 1) of the excavator 14 can be used to elevate a portion of the tracks 18 above the ground to allow the first high rail mechanism 20 to make contact with the rails 15 illustrated in FIG. 1. Once in contact, an operator can manually lock the first high rail mechanism 20 in the lowered position using a pin or similar element. The same process can be followed for the second high rail mechanism (see FIG. 2).

As will be discussed in greater detail below, as the coupling shaft 74 moves through space, the scissor linkages 60 will change their configuration by opening and closing ultimately to lower and raise the first high rail mechanism 20 and more particularly to bring the wheels 56 into and out of engagement with the rails 15 (see FIG. 1) respectively.

The second ends 80 of the lower links 64 mount to the lower mounting point 84 of the lower arm 82 via a pin 86. Similarly, the first end 66 of the upper link 62 mounts to the upper mounting point 72 of the upper arm 70 with a pin 86. As such, the upper and lower links 62, 64 are free to rotate relative to the upper and lower arms 70, 72 about the upper and lower mounting points 72, 84 respectively.

A support plate 102 extends between the upper arms 70. The support plate 102 supports the power control arrangement 104. The power control arrangement 104 is coupled between the power source 106 of the excavator 14 (see FIG. 1) and the remainder of the first high rail mechanism 20.

As will be explained in greater detail below, the power control arrangement 104 is operable to manage the distribution of power between the drive train of the excavator 14 (see FIG. 1) and the drive train of the first high rail mechanism 20. The power control arrangement 104 includes a diverting valve 140 and a dynamic braking valve 142. The diverting valve 140 is a switch that diverts hydraulic power ordinarily supplied from the power source 106 to the drive train of the excavator 14 to the drive train of the first high rail mechanism 20 (shown schematically as communicating with the drive shaft 58 through the dynamic braking valve 142).

The dynamic braking valve 142 is operable to govern the amount of fluid pressure supplied to the hydraulic motor (not shown) that turns the drive shaft 58 of the first high rail mechanism 20. The dynamic braking valve 142 is a variable output flow control valve. Accordingly, the dynamic braking valve 142 advantageously manipulates fluid pressure used to turn the drive shaft 58 to ultimately reduce the rpm of the shaft to assist in smooth non-abrupt braking.

Figure 5:
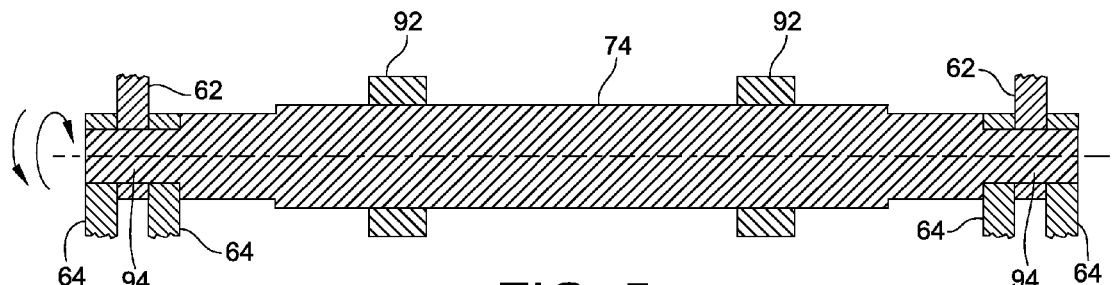
FIG. 5 is a front cross sectional view of a coupling shaft, collars, and first and second links of the high rail mechanism of FIG. 4.

With reference to the cross sectional illustration of FIG. 5, the upper and lower links 62, 64 generally form a pin type connection at a common connection point illustrated as the ends 94 of the shaft 74. The upper and lower links 62, 64 as well as the collars 92 are free to rotate in directions relative to the coupling shaft 74.

Figure 6:
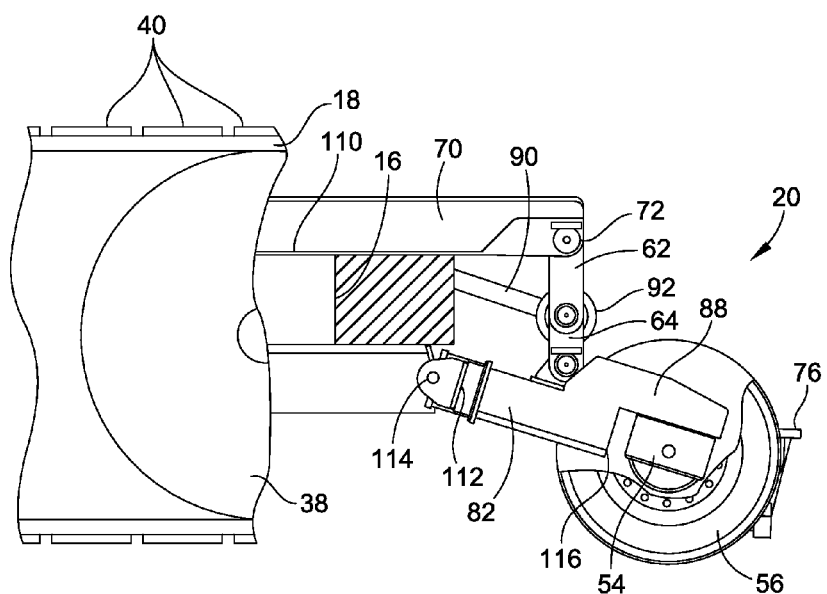
FIG. 6 is a partial side exposed view of one of the first and second high rail mechanisms of FIG. 2.

Turning now to FIG. 6, a side view of the upper and lower arms 70, 82 is illustrated. While the following describes each in the singular, it will be recognized that the same description applies to both upper arms 70, and both lower arms 82 (see FIG. 4). As will be recognized from the following, the upper arms 70 generally form one embodiment of an upper mount, and the lower arms 82 generally form an embodiment of a lower mount.

The upper arm 70 has an end 110 that is fixedly mounted to the track bed 16. The upper arm 70 generally remains fixed relative to the track bed 16 and the remainder of the first high rail mechanism 20 during the operation thereof. The upper arm 70 may be fixedly connected to the track bed 16 in a variety of ways including, for example, bolts, welding, brazing, or by similar processes and using similar structures.

The lower arm 82 connects to the track bed 16 at a track bed connection point 114 formed in an end 112 of the lower arm. The track bed connection point 114 is a pin joint that allows the lower arm 82 to rotate about the track bed connection point 114. A jaw 88 (see also FIG. 4) is formed at a distal end 116 of the lower arm 82. The jaw 88 mounts to the differential 54 and generally carries and supports the differential 54.

Figure 7:
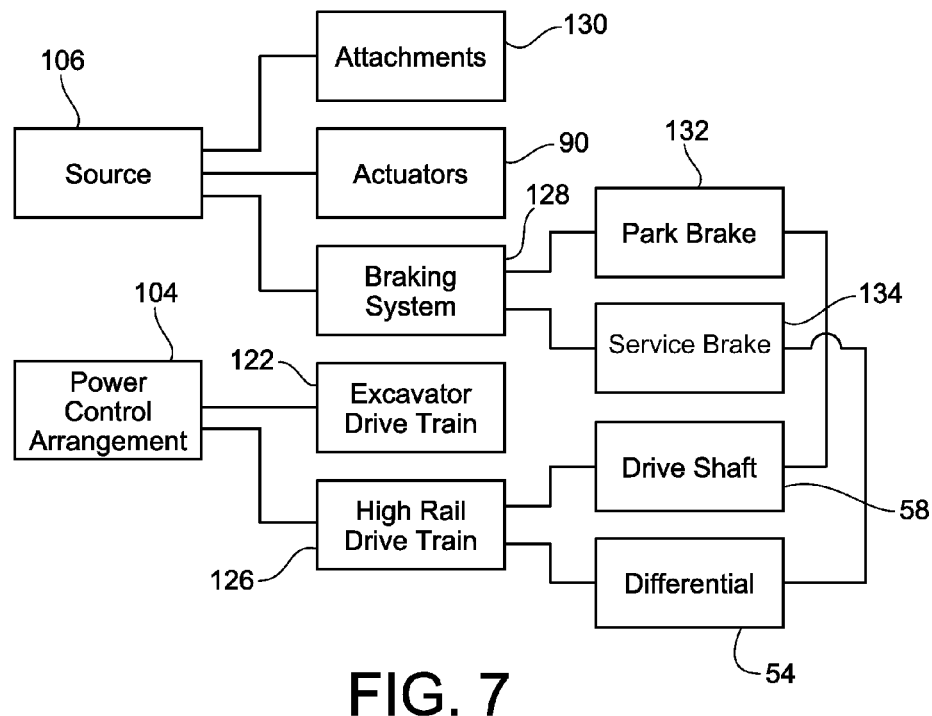
FIG. 7 is a block diagram of a power control arrangement of one of the first and second high rail mechanisms of FIG. 2.

Referring now to FIG. 7, a schematic representation of the power system of the excavator 14 (see FIG. 1) is illustrated. In the illustrated embodiment, the power control arrangement 104 is operable to switch the supply of fluid power from the excavator drive train 122 to the high rail drive train 126. This switching is operator controlled, with a switch or other electronic control available to the operator in the cab of the excavator 14 to effectuate the same. However, the power source 106 remains in fluid communication with attachments 130 of the excavator 14, and the actuators 90 and braking system 128 of the first and second high rail mechanisms 20, 22 (see FIG. 2), regardless of whether the operator has selected to use the excavator drive train 122 or the high rail drive train(s) 126.

As schematically illustrated, the braking system 128 includes a park brake 132 and a service brake 134. The park brake is in mechanical communication with the drive shaft 58 of the first high rail mechanism 20, while the service brake 134 is a wet disc type brake in mechanical communication with the differential 54 of the first high rail mechanism 20. It will be recognized that the same braking arrangement applies to the second high rail mechanism 22 (see FIG. 2).

Figure 8:
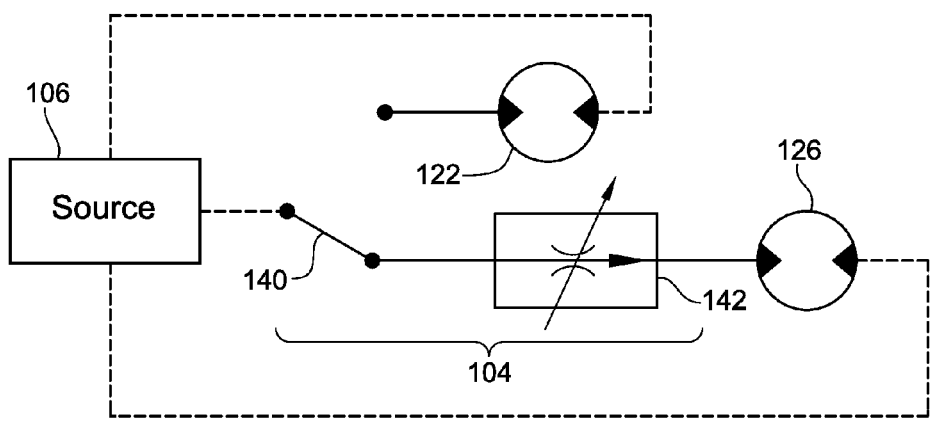
FIG. 8 is a schematic diagram of the power control arrangement of FIG. 7.

Turning now to FIG. 8, the power control arrangement 104 is schematically illustrated. The diverting valve 140 is schematically shown as a switch, operable to complete a circuit between the power source 106 and the excavator drive train 122, or between the power source 106 and the high rail drive train 126. The diverting valve 142 is also schematically shown as a variable output flow control valve. The diverting valve 142 is operable to govern the amount of fluid power supplied to the high rail drive train 126. As discussed above, this functionality advantageously assists in braking. More particularly, the service brakes 134 of the first and second high rail mechanisms 20, 22 (see FIG. 7) are ordinarily used to reduce the speed of the excavator 14 (see FIG. 1) when propelled by the first and second high rail mechanisms 20, 22. However, there is a risk that the excavator will slide along the rails 15 (see FIG. 1) when braking using the service brakes 134 alone. Accordingly the dynamic braking valve 142 is operable to gradually ramp down the rpm's of the drive shaft 58 (see FIGS. 4 and 7) to assist in braking and reduce or eliminate the likelihood of a sliding stop.

Additionally, the power control arrangement 104 integrates with an existing power source 106 of the excavator 14, therefore no additional power system is needed for either of the first or second high rail mechanisms 20, 22 (see FIG. 2). Such functionality advantageously allows the first and/or second high rail mechanisms 20, 22 to be integrated with many different types of heavy equipment without the expense of an additional power source. However, in other embodiments, it is recognized that each of the first and second high rail mechanisms 20, 22 can be supplied with a stand alone power source, or share a common stand alone power source.

Having discussed the general structural attributes of the high rail excavator 14 as illustrated in FIGS. 1 through 8, the remainder of the discussion will focus on the operation of the same.

Figure 9:
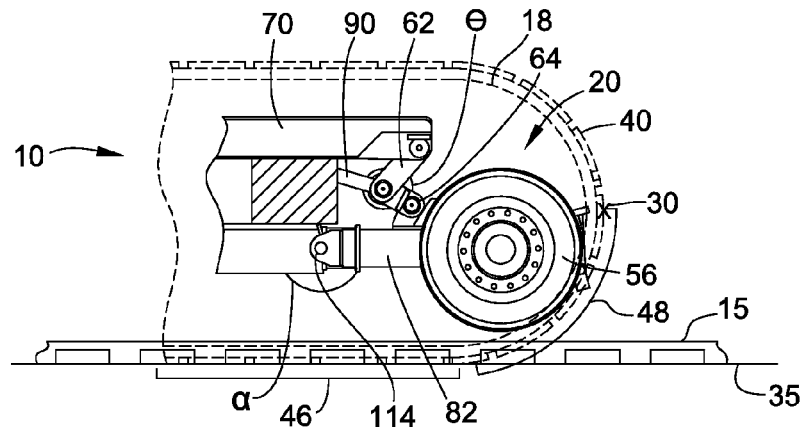
FIGS. 9-11 are partial side exposed views of one of the first and second high rail mechanisms of FIG. 2 in various modes of operation.

Turning now to FIG. 9, the first high rail mechanism 20 is illustrated in the raised position. When in the raised position, the tracks 18 generally contact the ground 35 and are capable of transporting the high rail excavator 14. As discussed above, the first high rail mechanism 20 is also disposed behind a leading edge 30 of the tracks 18 (see FIG. 2). The scissor linkage 60 (see FIG. 4) and more particularly, the first and second links 62, 64 are generally folded inward such that there is a first angle $\ominus$ therebetween. Additionally, the lower arm 72 is generally disposed relative to the track bed 16 at a first angle $\alpha$. As discussed above, the first high rail mechanism 20 is disposed above a bottom surface 46 of the tracks, a transition portion 48 of the tracks, and behind the leading edge 30 of the tracks 18.

Figure 10:
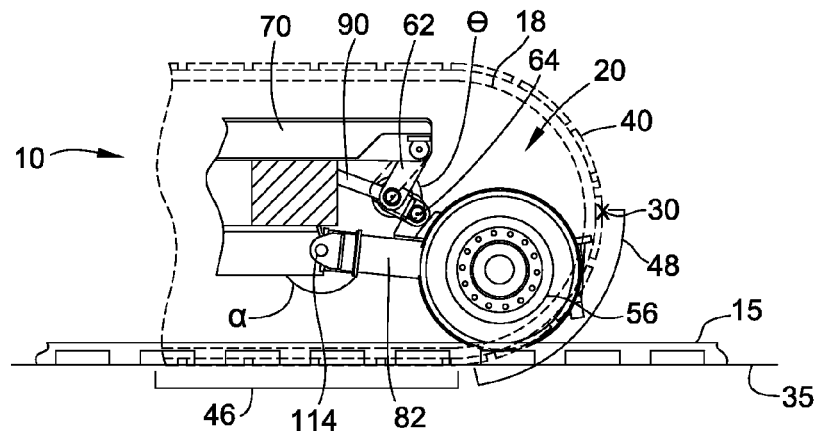

Turning now to FIG. 10, the first high rail mechanism 20 is illustrated in transition between the raised and the lower positions. As the length of the actuators 90 increases, the scissor linkage 60 (see FIG. 4) and more particularly the upper and lower links 62, 64 begin to straighten or open such that the angle $\ominus$ therebetween increases. Likewise, the lower arm 72 rotates about the track bed connection point 114 such that the angle $\alpha$ therebetween the lower arm 72 and the track bed 16 decreases.

With reference to FIG. 11 the first high rail mechanism 20 is illustrated in the fully lowered position. In the fully lowered position, the upper and lower links 62, 64 are generally in line with one another such that the angle $\ominus$ is approximately 180° so that the upper and lower links 62, 64. In other embodiments, the upper and lower links 62, 64 can be locked such that they are over center in the lowered position. The lower arm 72 has also completed its rotation about the track bed connection point 114 in the lower position. When this is so, the angle $\alpha$ between the lower arm 72 and the track bed 16 is generally greater than 90° but generally less than 180°.

When in the lowered position, the wheels 56 are in contact with the rails 15, and the tracks 18 are elevated above the ground 35. In the illustrated embodiment, a portion of the first high rail mechanism 20 is below the bottom surface 46 of the tracks, below the transition portion 48, yet still behind the leading edge 30 in the lowered position. However, it will be recognized that the first high rail mechanism 20, or any portion thereof, need not extend below the bottom surface 46 and/or the transition portion 48 to elevate the tracks 18 above the ground 35. Indeed, the wheels 56 may contact the rails 15 and elevate the tracks 18 above the ground 35 while staying above the bottom surface 46 of the tracks 18. It will also be recognized from the foregoing that the same characteristics of operation are present for the second high rail mechanism 22 (see FIG. 2).

An alternative view of the excavator 14 in the raised position is illustrated in FIG. 12. As illustrated, the wheels 56 of the first and second high rail mechanisms 20, 22 are in contact with the rails 15. Additionally, the tracks 18 are elevated such that they are out of contact with the ground 35. In contemporary tracked vehicles, it is common to supply the track such that there is a sufficient amount of slack in the track to avoid brakeage thereof during operation. However, because the tracks 18 of the high rail excavator 14 are at times elevated above the ground, there is a potential for the slack ordinarily present in a pair of tracks to drag along the ground once the tracks 18 are elevated. The slack that would ordinarily be present is illustrated by track line 150. To avoid the undesirable occurrence of the tracks 18 dragging along the ground, the tracks 18 are supplied with a greater amount of track tensioning to ensure that they are sufficiently elevated above the ground 35 when the first and second high rail mechanism 20, 22 are in the lowered position as illustrated.

With reference now to FIG. 13, the first high rail mechanism 20 is illustrated in the raised position. When the first high rail mechanism 20 is in the raised position, there is sufficient clearance as illustrated by dimension 152 between the first high rail mechanism 20 and the rails 15 such that the excavator 14 can mount and dismount the railroad rails 15 without interference therefrom. It will be recognized that this clearance is also present on the second high rail mechanism 22 (see FIG. 2). This clearance allows the excavator 14 to simply drive over the rails 15 to align the first and second high rail mechanisms 20, 22 (see FIG. 1) with the rails 15.

Still referring to FIG. 13, the width W between the inner peripheral edges 42 of the tracks 18 can be achieved in a variety of ways. As one example, the tracks of a conventional excavator can be trimmed to achieve the illustrated width W between the tracks 18. As another example, the tracks of a conventional excavator can be mounted to the illustrated excavator 14 at the desired width W without trimming. Indeed, it will be recognized that the illustrated tracks 18 can begin as conventional tracks but thereafter be retrofitted, by machining, mounting, or a combination of machining and mounting, to achieve the desired width W.

The high rail excavator 14 accomplishes the advantages and benefits described herein by providing a first and second high rail mechanism 20, 22 that are selectively positionable between raised and lowered positions to allow the high rail excavator 14 to travel along a pair of rails 15 of a railroad track. The first and second high rail mechanisms are each respectively disposed within an envelope of space 26, 28 of the high rail excavator 14 so that they do not extend beyond a first and second leading edge 30, 32 of the tracks 18 of the high rail excavator 14, or alternatively do not extend beyond a boundary plane 31. Because the first and second high rail mechanisms 20, 22 do not extend beyond the first and second leading edges, 30, 32 and/or a boundary plane 31, the high rail excavator 14 has greater maneuverability and offers greater safety by reducing the likelihood that equipment or other personnel situated nearby will not be struck by the high rail mechanisms 20, 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An excavator, comprising:
a pair of tracks mounted in opposed spaced relation, each one of the pair of tracks having an inner peripheral edge, the inner peripheral edges spaced apart a first distance;
a high rail mechanism interposed between the inner peripheral edges and having a pair of wheels spaced apart by a second distance; and
wherein the first distance is greater than the second distance, such that the pair of wheels are interposed between the tracks; and
wherein the pair of wheels are behind a leading edge of the tracks.

2. The excavator of claim 1, wherein the pair of wheels have a raised position and a lowered position, wherein in the lowered position the pair of wheels are behind a leading edge of the pair of tracks, and below a bottom surface of the pair of tracks.

3. The excavator of claim 2 wherein in the raised position the pair of wheels are behind a leading edge of the pair of tracks and above a transition portion of the pair of tracks.

4. The excavator of 1, wherein the first distance is at least about 4 feet, 8½ inches.

5. An excavator, comprising:
a pair of tracks mounted in opposed spaced relation, each one of the pair of tracks having an inner peripheral edge, the inner peripheral edges spaced apart a first distance;
a high rail mechanism interposed between the inner peripheral edges and having a pair of wheels spaced apart by a second distance; and
wherein the first distance is greater than the second distance, such that the pair of wheels interposed between the tracks; and
wherein each one of the pair of tracks has an outer peripheral edge, and each one of the pair of tracks is supported by a track support structure of the excavator, each track support structure having inner and outer peripheral edges, wherein the inner peripheral edge of each one of the pair of tracks extends beyond the inner peripheral edge of the track support structure supporting the track by a first overhang distance, and wherein the outer peripheral edge of each one of the pair of tracks extends beyond the outer peripheral edge of the track support structure supporting the track by a second overhang distance, the first overhang distance being less than the second overhang distance.

6. A high rail mechanism, comprising:
an upper mount;
a lower mount;
a pair of wheels carried by the lower mount;
a linkage connected between the upper and lower mounts;
an actuator operably connected to the linkage, the actuator operable to move the lower mount and the wheels relative to the upper mount and in a first direction away from the upper mount, and move the lower mount and the wheels relative to the upper mount in a second direction toward the upper mount; and
wherein linkage includes a first scissor linkage, the first scissor linkage having a first link and a second link, the first link connected between the upper mount and the second link, the second link connected between the first link and the lower mount, the first and second links having a first common connection point.

7. The high rail mechanism of claim 6, wherein the linkage further comprises a second scissor linkage, the second scissor linkage having a first link and a second link, the first link of the second scissor linkage connected between the upper mount and the second link of the second scissor linkage, the second link of the second scissor linkage connected between the first link of the second scissor linkage and the lower mount, the first and second links of the second scissor linkage having a second common connection point.

8. The high rail mechanism of claim 7, further comprising a coupling shaft extending between the first and second common connection points and connected with the first and second links of the first scissor linkage at the first common connection point and connected with the first and second links of the second scissor linkage at the second common connection point.

9. The high rail mechanism of claim 8, wherein the actuator is a linear actuator connected to the coupling shaft such that an actuation of the actuator in a first direction simultaneously increases an angle between the first and second links of the first scissor linkage, and increases an angle between the first and second links of the second scissor linkage, and wherein an actuation of the actuator in a second direction simultaneously decreases an angle between the first and second links of the first scissor linkage, and decreases an angle between the first and second links of the second scissor linkage.

10. The high rail mechanism of claim 9, wherein the linear actuator is connected to the coupling shaft via a collar, the collar rotatable about the coupling shaft.

11. A method of affixing a high rail mechanism to an excavator, the method comprising the steps of:
adjusting a first distance between inner peripheral edges of a pair of tracks in opposed spaced relation to a second distance greater than the first distance; and mounting the high rail mechanism having an overall width less than the second distance to the excavator between the inner peripheral edges.

12. The method of claim 11 wherein the step of adjusting includes removing material from each one of the pair of tracks.

13. The method of claim 12 wherein the step of adjusting includes removing material from the inner peripheral edges of each one of the pair of tracks.

14. The method of claim 13 further including remounting the pair of tracks to the high rail excavator after removing material such that the inner peripheral edges of the pair of tracks are spaced apart by the second distance.

15. The method of claim 11 wherein the step of adjusting includes removing the pair of tracks from the excavator and remounting the tracks such that the inner peripheral edges are at the second distance.

* * * * *